(12) United States Patent
Weyant

(10) Patent No.: US 8,356,413 B2
(45) Date of Patent: Jan. 22, 2013

(54) THERMALLY SPRAYED STRUCTURES FOR FOIL BEARINGS

(75) Inventor: Christopher M. Weyant, Montclair, NJ (US)

(73) Assignee: Honeywell International Inc., Morristown, NJ (US)

( * ) Notice: Subject to any disclaimer, the term of this patent is extended or adjusted under 35 U.S.C. 154(b) by 1606 days.

(21) Appl. No.: 11/586,028

(22) Filed: Oct. 24, 2006

(65) Prior Publication Data

US 2010/0067837 A1    Mar. 18, 2010

(51) Int. Cl.
 *B21D 53/10* (2006.01)
(52) U.S. Cl. ............... 29/898.12; 29/898.13; 29/898.14
(58) Field of Classification Search ............... 29/898.12, 29/898.054, 423, 424, 17.3, 17.9, 898.13, 29/898.14; 427/446, 454; 264/258; 156/169, 156/173
See application file for complete search history.

(56) References Cited

U.S. PATENT DOCUMENTS

| 3,763,001 | A | * | 10/1973 | Withers ........................ 205/73 |
| 4,005,914 | A |   | 2/1977  | Newman |
| 4,435,839 | A |   | 3/1984  | Gu et al. |
| 4,751,099 | A | * | 6/1988  | Niino et al. ................... 427/450 |
| 4,786,566 | A |   | 11/1988 | Siemers |
| 5,211,776 | A | * | 5/1993  | Weiman ........................ 148/525 |
| 5,518,777 | A | * | 5/1996  | Shimamune et al. ......... 427/454 |
| 5,866,518 | A |   | 2/1999  | Dellacorte et al. |
| 6,113,991 | A | * | 9/2000  | Salito ............................ 427/455 |
| 6,158,893 | A |   | 12/2000 | Heshmat |
| 6,505,837 | B1|   | 1/2003  | Heshmat |

FOREIGN PATENT DOCUMENTS

| EP | 0358800 A1 | 3/1990 |
| WO | WO 2005/038062 A1 | 4/2005 |
| WO | WO 2005/103331 A1 | 11/2005 |

* cited by examiner

*Primary Examiner* — David Bryant
*Assistant Examiner* — Ryan J Walters
(74) *Attorney, Agent, or Firm* — Ingrassia Fisher & Lorenz, P.C.

(57) ABSTRACT

The present invention provides a method of making a foil component of a foil bearing, where the foil component has an inner surface, an inner portion, and an outer portion. In one embodiment, and by way of example only, the method includes thermally spraying a first material onto an outer surface of a sacrificial substrate to form the foil component inner portion, where the first material includes a solid film lubricant, and the outer surface has a shape that is complementary to the inner surface of the foil component. A second material is then thermally sprayed over the inner portion to form the outer portion, and the second material includes a metal. The sacrificial substrate is then removed to expose the foil component.

15 Claims, 4 Drawing Sheets

THERMALLY SPRAYED STRUCTURES FOR FOIL BEARINGS

TECHNICAL FIELD

The present invention relates to foil bearings and, more particularly, to methods for manufacturing foil components of foil bearings.

BACKGROUND

A gas turbine engine may be used to power various types of vehicles and systems. A particular type of gas turbine engine that may be used to power aircraft is a turbofan gas turbine engine. A turbofan gas turbine engine may include, for example, five major sections: a fan section, a compressor section, a combustor section, a turbine section, and an exhaust section.

During operation, a fan induces air from the surrounding environment into an inlet of the fan section and accelerates a fraction of this air toward the compressor section. The compressor section raises the pressure of the air it receives from the fan section to a relatively high level. The pressurized air enters the combustor section, where a ring of fuel nozzles injects a steady stream of fuel into a plenum formed by liner walls and a dome. The injected fuel is ignited in the combustor, which significantly increases the energy of the compressed air. The high-energy compressed air from the combustor section then flows into and through the turbine section, causing rotationally mounted turbine blades to rotate and generate energy. The air exiting the turbine section is exhausted from the engine via the exhaust section, and the energy remaining in the exhaust air aids the thrust generated by the air flowing through the bypass plenum.

Generally, the rotating components of the engine are supported by bearings. In cooler sections of the engine, such as the fan section, one or more foil bearings may be included. A foil bearing generally includes a journal (mounted to the rotating component) and a cylindrical top foil disposed therearound. The journal and top foil are in contact when stationary and at low journal rotational speeds. They are spaced apart from each other during high rotational speed. The journal is typically coated with a hard, organic material to thereby prevent premature wear. Cool air may also be provided between the journal and top foil.

Although foil bearings have advantages, they have some drawbacks. For example, foil bearings may not be useful in high temperature applications, such as in the compressor or combustor sections of the gas turbine engines. Specifically, the material used for the journal coating may vaporize when exposed to high temperatures, such as 315° C. and above. To prevent coating vaporization, the foil bearing is preferably cooled to an acceptable temperature. However, cooling down the foil bearing from the high temperatures presents certain challenges. In particular, liquid-cooling the foil bearing may not be practical, because potential cooling liquids may vaporize when exposed to the high temperatures. Moreover, a large amount of air may be needed to air-cool the foil bearing, thereby undesirably decreasing engine efficiency.

Hence, there is a need for a foil bearing system that may be implemented into high temperature sections of the gas turbine engine, such as in the compressor or combustor sections. It is also desirable for the system to be lightweight and capable of being retrofitted into existing gas turbine engines. Moreover, it is desirable to have methods for manufacturing the system that are cost-effective.

BRIEF SUMMARY

The present invention provides a method of making a foil component of a foil bearing, where the foil component has an inner surface, an inner portion, and an outer portion. In one embodiment, and by way of example only, the method includes thermally spraying a first material onto an outer surface of a sacrificial substrate to form the foil component inner portion, where the first material includes a solid film lubricant, and the outer surface has a shape that is complementary to the inner surface of the foil component. A second material is then thermally sprayed over the inner portion to form the outer portion, and the second material includes a metal. The sacrificial substrate is then removed to expose the foil component.

In another embodiment, and by way of example only, a method is provided for making a foil component of a foil bearing, where the foil component has an inner surface, an inner portion, a graded portion, and an outer portion. The method includes thermally spraying a first material onto an outer surface of a sacrificial substrate to form the foil component inner portion, where the first material includes a solid film lubricant, and the outer surface has a shape that is complementary to the foil component inner surface. The graded portion is formed over the inner portion and includes the first material and a metal. The graded portion is formed by thermally spraying the first material and the metal onto the inner portion at a first ratio to form a first portion of the graded portion, adjusting the first ratio to a second ratio, and thermally spraying the first material and metal over the first portion at the second ratio to form a second portion of the graded portion. Next, another layer that includes the metal is thermally sprayed over the graded portion to form an outer portion. The sacrificial substrate is then removed to expose the foil component.

In still another embodiment, and by way of example only, a journal bearing is provided that includes a journal and a foil bearing. The journal has an outer surface. The foil bearing is disposed around the journal, and includes an inner surface, an inner portion, an outer portion, and a graded portion therebetween. The inner surface defines, in part, the inner portion and is configured to contact the journal outer surface. The inner portion includes a solid film lubricant, the outer portion includes a metal-based alloy, and the graded portion includes both the solid film lubricant and the metal-based alloy.

Other independent features and advantages of the preferred foil component and methods of making the component will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
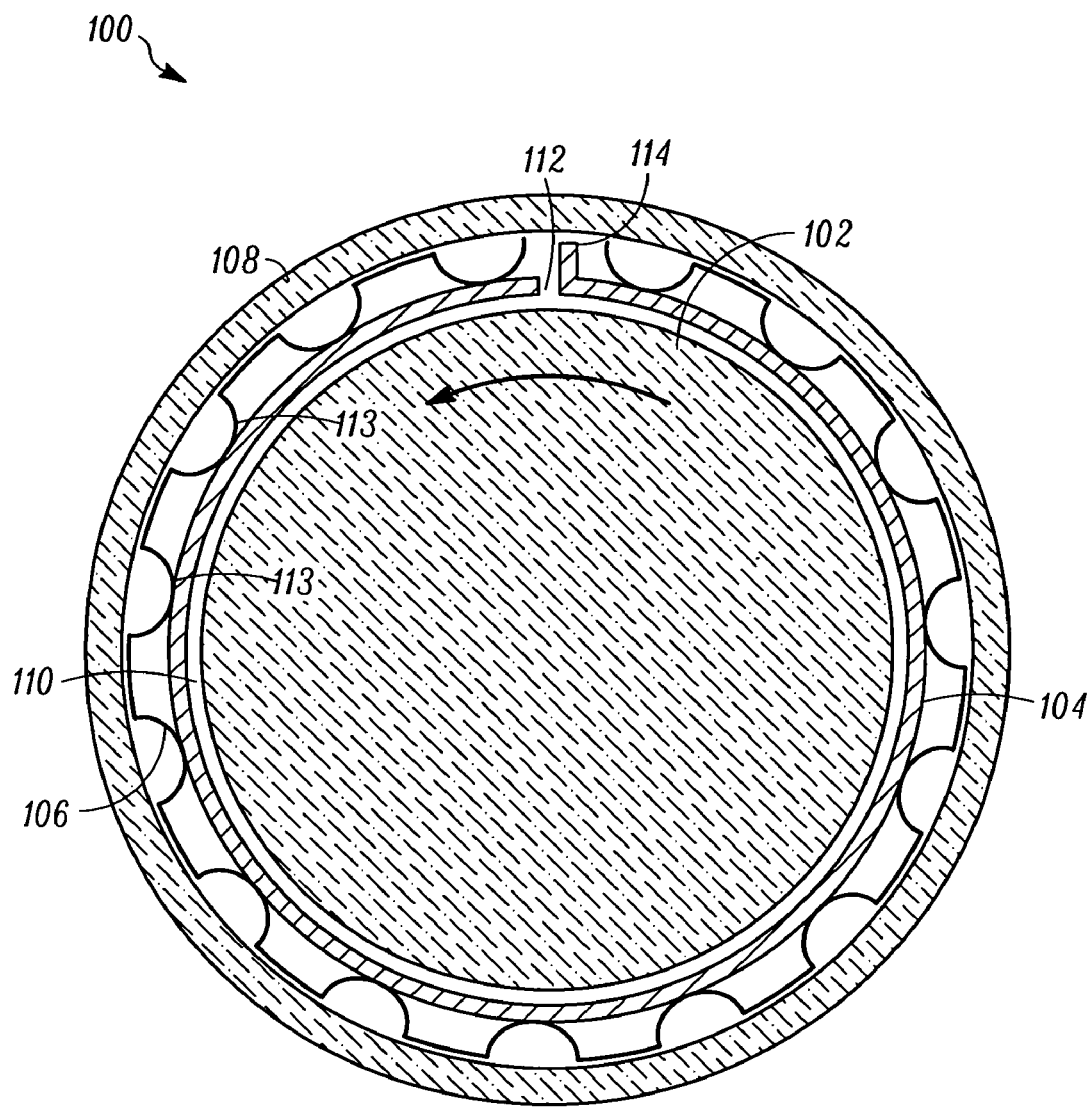
FIG. 1 is a cross section view of a simplified exemplary journal bearing.

Turning now to FIG. 1, a simplified exemplary journal bearing 100 is depicted. The journal bearing 100 includes a journal 102, a foil bearing 104, and a spring 106, all disposed within a bearing housing 108. The journal 102 may be mounted to a rotating component (not shown), such as a shaft. The foil bearing 104 surrounds the journal 102 and is separated therefrom by an airgap 110 during higher rotational speeds of the journal 102. The spring 106 is disposed between the foil bearing 104 and the bearing housing 108 and is configured to maintain the positioning of the foil bearing 104 therein. The spring 106 may include a plurality of indentations 113 that contact the foil bearing 104, as shown in FIG. 1. However, it will be appreciated that the spring 106 may have any other suitable configuration.

Figure 2:
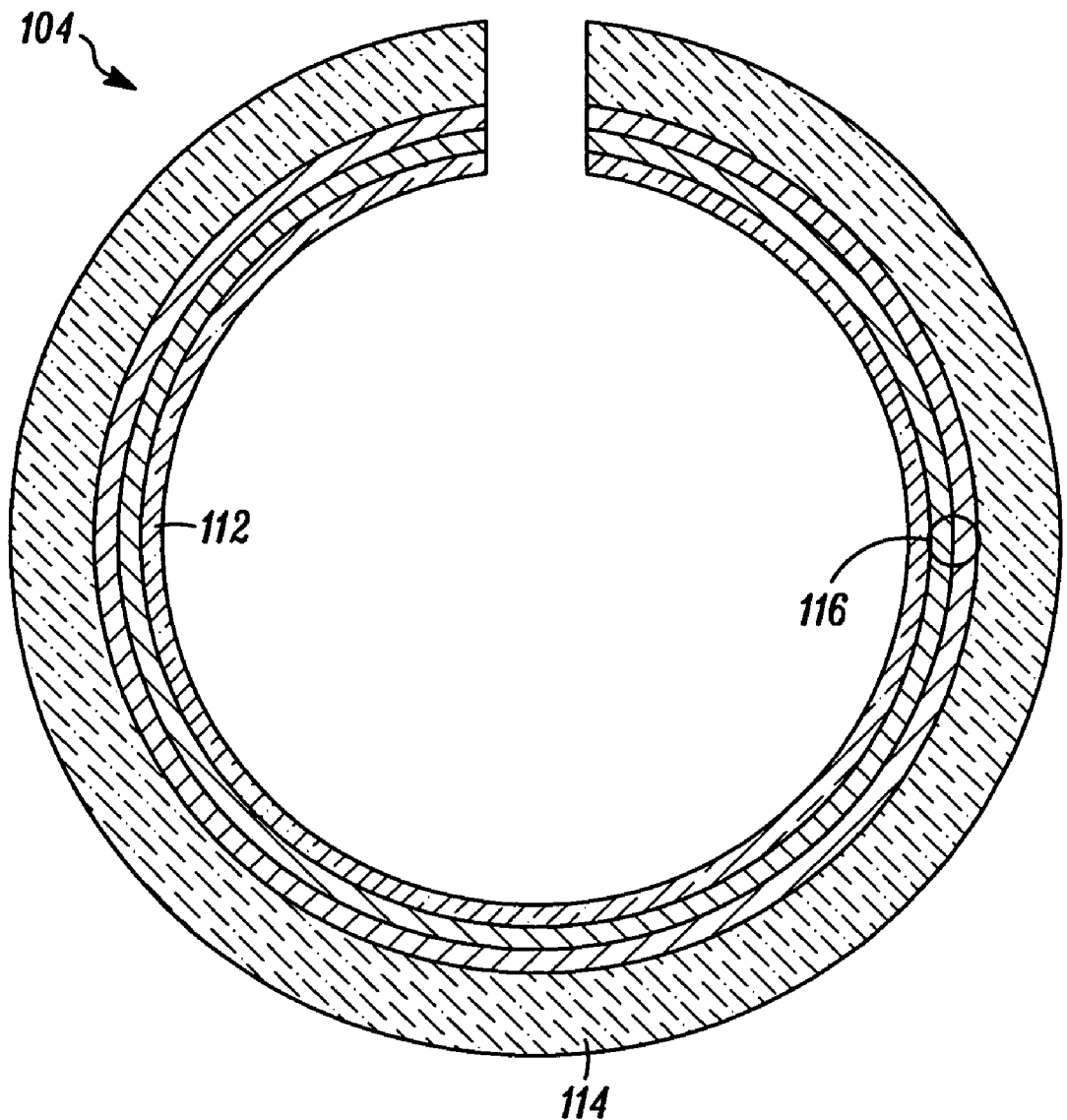
FIG. 2 is a close up view of an exemplary foil bearing that may be implemented into the journal bearing depicted in FIG. 1.

The foil bearing 104, a portion of which is shown more closely in FIG. 2, is configured to support the journal 102 during journal rotation and includes an inner portion 112, an outer portion 114, and a graded portion 116 therebetween. The inner portion 112 is configured to provide low friction and high wear resistance when the journal 102 comes into contact therewith. In this regard, the inner portion 112 is preferably made of a solid film lubricant composite that allows the journal 102 to slide thereagainst during bearing operation, while maintaining structural integrity when exposed to temperatures in excess of at least 315° C.

The solid film lubricant may be any one of numerous suitable materials that allow self-lubrication with components that come into contact therewith. In one exemplary embodiment, the solid film lubricant includes chromium oxide, and metal fluoride. The metal fluoride may include a fluoride of at least one metal selected from the group consisting of a Group IA alkali earth metal, a Group IIA alkaline earth metal, rare earth metal, and mixtures thereof. In another embodiment, the solid film lubricant not only includes chromium oxide and metal fluoride, but may optionally include one or more low temperature lubricating metals selected from the group consisting of Ag, Au, Pt, Pd, Rh, Cu and mixtures thereof.

In another exemplary embodiment, the solid film lubricant includes metal bonded chromium oxide. The amount of the chromium oxide present in the material ranges from about 10 wt. % to about 60 wt. %. The bonding metal may be an alloy containing Cr and at least one of Ni, Co or mixtures thereof, and the amount of the bonding metal present may range from about 20 wt. % to about 80 wt. %, about 5 wt. % to about 20 wt. % of a metal fluoride. The metal fluoride may include a fluoride of at least one metal selected from the group consisting of a Group IA alkali earth metal, a Group IIA alkaline earth metal, rare earth metal, and mixtures thereof. Optionally, about 5 wt. % to about 20 wt. % of one or more low temperature lubricating metals selected from the group consisting of Ag, Au, Pt, Pd, Rh, Cu and mixtures thereof, may be included as well.

In still another embodiment, the solid film lubricant includes metal bonded, particulate $Cr_2O_3$, a fluoride, and optionally, a low temperature metal lubricant. The solid film lubricant may include from about 60 wt. % to about 80% of metal bonded, particulate $Cr_2O_3$ where the bonding metal may be an alloy containing Cr and at least one of Ni, Co or mixtures thereof. The solid film lubricant may also include about 5 wt. % to about 20 wt. % of the fluoride of at least one metal selected from the group consisting of a metal of Group IA, Group IIA, rare earth metal and mixtures thereof. The solid film lubricant may further include about 5 wt. % to about 20 wt. % of a low temperature metal lubricant selected from the group consisting of Ag, Au, Pt, Pd, Rh, Cu and mixtures thereof.

In still yet another embodiment, the solid film lubricant includes metal bonded chromium oxide wherein the amount of the chromium oxide present in the solid film lubricant ranges from about 10 wt. % to about 60 wt. % and the bonding metal is an alloy containing Cr and at least one of Ni, Co or mixtures thereof. The amount of the bonding metal ranges from about 20 wt. % to about 80 wt. %. The solid film lubricant may further include about 5 wt. % to about 20 wt. % of metal fluoride, wherein the metal fluoride comprises a eutectic mixture of barium and calcium fluorides. Optionally, the solid film lubricant may include from about 5 wt. % to about 20 wt. % of one or more low temperature lubricating metals selected from the group consisting of Ag, Au, Pt, Pd, Rh, Cu and mixtures thereof.

It will be appreciated that any other suitable solid film lubricant may be employed. In some embodiments, the solid film lubricant may include additional constituents for wear resistance, such as glass.

The outer surface 114 is made of a metal alloy that is capable of maintaining its structural integrity when exposed to temperatures of at least 315° C. Suitable alloys include, but are not limited to nickel-based superalloys, and cobalt-based superalloys. The graded portion 116 is functionally graded and, in some embodiment, may be continuously graded. Preferably, the graded portion 116 includes both the solid film lubricant and the metal alloy.

Figure 3:
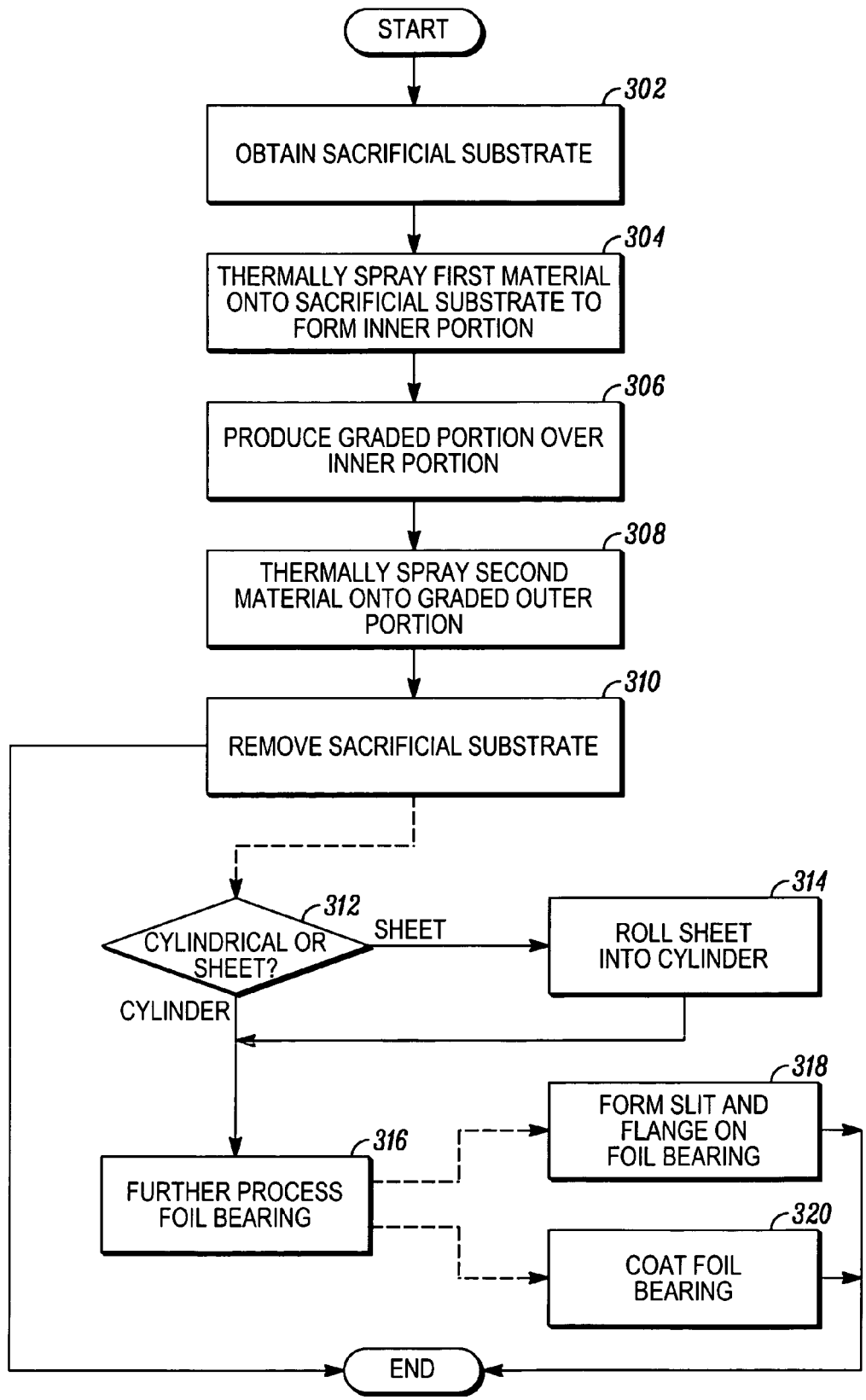
FIG. 3 is a flow diagram of an exemplary method for manufacturing the foil bearing shown in FIG. 2.
Figure 4:
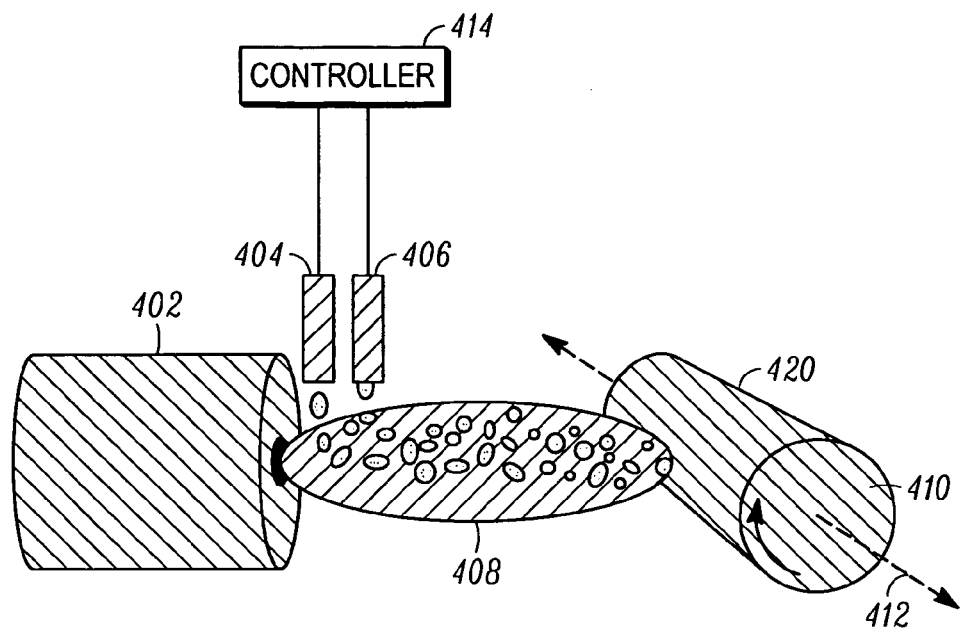
FIG. 4 is a simplified view of one example of one of the steps of the method depicted in FIG. 3.

FIG. 3 illustrates an exemplary method 300 for forming the foil bearing 104. First, a suitably shaped sacrificial substrate is obtained, step 302. In one exemplary embodiment, as shown in FIG. 4, the sacrificial substrate 410 has an outer surface 420 that complements the shape of the inner surface of the foil bearing 104. In another embodiment, shown in FIG. 5, the sacrificial substrate 510 is rectangularly shaped and has a substantially flat exposed surface 512. In some cases, the substrate may need to be pre-processed to ease removal from the resulting foil bearing 104. For example, the substrate may need to be polished to form a smooth surface or may need to be coated with a dissolvable coating.

Next, a first material is thermally sprayed onto the outer surface 420 of the sacrificial substrate 410, 510 to form the foil bearing inner portion 112, step 304. The first material is preferably one of the above-described solid film lubricants, or a material having similar characteristics. The first material may be thermally sprayed using any one of numerous techniques, such as, for example, by atmospheric plasma spraying, vacuum plasma spraying, or high velocity oxy-fuel spraying.

Figure 5:
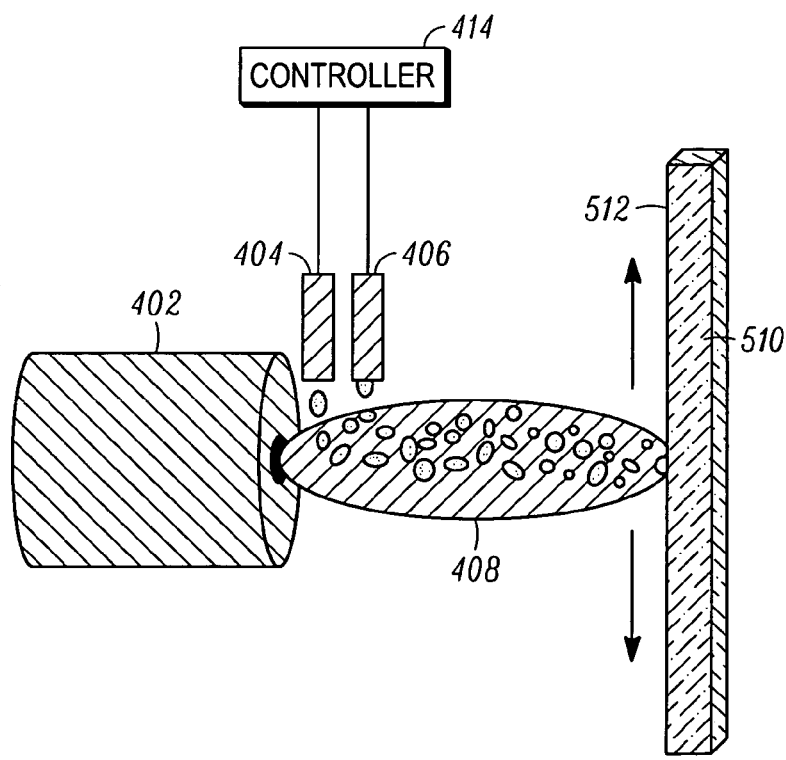
FIG. 5 is a simplified view of another example of one of the steps of the method depicted in FIG. 3.

One exemplary thermal spraying technique is depicted in FIG. 4. Here, a thermal spray gun 402 is used in conjunction with two or more powder injectors 404, 406. The thermal spray gun 402 provides a flame 408, and in this step, one of the powder injectors 404 injects a powder form of the solid film lubricant into the flame 408. The solid film lubricant liquefies and is directed at the sacrificial substrate 410. In some embodiments, as shown in FIG. 4, the thermal spray gun 402 and powder injectors 404, 406 are stationary, while the sacrificial substrate 410 rotates around an axis 412. In other embodiments, the thermal spray gun 402 and powder injectors 404, 406 are mounted to a robot arm (not shown) that can move in a suitable direction relative to the sacrificial substrate 510, such as shown in FIG. 5.

After the inner portion 112 is formed, the graded portion 116 is then produced over the inner portion 112, step 306. In one exemplary embodiment, one of the powder injectors 404 continues to provide the first material to the flame 408, while the other powder injector 406 begins to provide a second material to the flame 408. The second material is preferably a powdered metal alloy, and may be, for example, a nickel-based superalloy. As the remainder of the graded portion 116 is being produced, the ratio between the first and second materials gradually changes from having a first composition that is similar to that of the inner portion 112 to a second composition that is similar to that of the outer portion 114. The powder injectors 404, 406 may be controlled by a controller 414 that is pre-programmed to gradually adjust the ratio between the components in the powder feeds 404, 406. The outer portion 114 is formed by thermally spraying the second material over the graded portion 116, step 308.

Next, the sacrificial substrate 410 is removed, step 310. The sacrificial substrate 410 may be removed using any suitable technique, such as, for example, by a chemical or mechanical removal technique. In some embodiments, substrate removal exposes a cylinder, which may or may not be the finished foil bearing 104, step 312. In other embodiments, such as in embodiments in which the substrate is rectangular, removal exposes a foil sheet, step 312. The foil sheet is then rolled to form a cylinder used to form the foil bearing, step 314.

In some embodiments, the cylinder may need to be further processed, step 316. For example, the foil bearing 104 may include a slit 112 (see FIG. 1) and flange 114 for installation and thus, may need to be further machined, step 318. In this regard, a cut may be made in the foil bearing 104 and the cut portion may be bent outward to form the flange 114. Alternatively, the foil bearing 104 may be coated with a material for additional thermal protection, step 320.

During engine operation, the journal 102 rotates with the rotating component (not shown). When the engine starts up or shuts down, or when the rotating component rotates at a low speed, the journal 102 may contact the foil bearing 104. Because the foil bearing 104 is constructed of a solid film lubricant composite that allows the journal 102 to slide thereagainst, the structural integrity of the foil bearing 104 is maintained when exposed to temperatures in excess of at least 315° C.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A method of making a foil bearing, the foil bearing having an inner surface, an inner portion, and an outer portion, the method comprising the steps of:
    thermally spraying a first material onto an outer surface of a sacrificial substrate to form the foil bearing inner portion, the first material comprising a solid film lubricant, and the outer surface having a shape that is complementary to the inner surface of the foil bearing;
    thermally spraying a second material over the inner portion to form the outer portion, the second material comprising a metal;
    removing the sacrificial substrate to expose an inner surface of the foil bearing; and
    cutting a portion of the foil bearing to form a slit therein; and
    bending the cut portion of the foil bearing outward to form a flange.

2. The method of claim 1, wherein the step of thermally spraying a first material comprises:
    thermally spraying the first material onto an outer surface of a sacrificial substrate, the sacrificial substrate having a cylindrical shape.

3. The method of claim 1, further comprising the step of:
    forming a functionally graded portion between the inner and outer portions, the functionally graded portion comprising the solid film lubricant and the metal.

4. The method of claim 3, wherein the step of forming a functionally graded portion-comprises the steps of:
    thermally spraying the solid film lubricant and the metal over the inner portion at a first ratio to form a first portion of the functionally graded portion;
    adjusting the first ratio to a second ratio; and
    thermally spraying the solid film lubricant and metal over the first portion at the second ratio to form a second portion of the functionally graded portion.

5. The method of claim 1, wherein the step of thermally spraying a first material comprises thermally spraying a first material comprising a solid film lubricant including:
    chromium oxide; and
    metal fluoride, wherein the metal fluoride comprises a fluoride of at least one metal selected from the group consisting of a Group IA alkali earth metal, a Group HA alkaline earth metal, rare earth metal, and mixtures thereof; and
    optionally, one or more low temperature lubricating metals selected from the group consisting of Ag, Au, Pt, Pd, Rh, Cu and mixtures thereof.

6. The method of claim 1, wherein the step of thermally spraying a first material comprises thermally spraying a first material comprising a solid film lubricant including:
    metal bonded chromium oxide wherein the amount of the chromium oxide present in the material ranges from about 10 wt. % to about 60 wt. %, and the bonding metal is an alloy containing Cr and at least one of Ni, Co or mixtures thereof, wherein the amount of the bonding metal present ranges from about 20 wt. % to about 80 wt. %; about 5 wt. % to about 20 wt. % of a metal fluoride, wherein the metal fluoride comprises a fluoride of at least one metal selected from the group consisting of a Group IA alkali earth metal, a Group HA alkaline earth metal, rare earth metal, and mixtures thereof.

7. The method of claim 1, wherein the step of thermally spraying a first material comprises thermally spraying a first material comprising a solid film lubricant consisting of from about (I) 60 wt. % to about 80% of metal bonded, particulate $Cr_2O_3$, wherein the bonding metal is an alloy containing Cr and at least one of Ni, Co or mixtures thereof (ii) about 5 wt. % to about 20 wt. % of a fluoride of at least one metal selected from the group consisting of a metal of Group IA, Group IIA, rare earth metal and mixtures thereof, and optionally, (iii) about 5 wt. % to about 20 wt. % of a low temperature metal lubricant selected from the group consisting of Ag, Au, Pt, Pd, Rh, Cu and mixtures thereof.

8. The method of claim 1, wherein the step of thermally spraying a first material comprises thermally spraying a first material comprising a solid film lubricant including metal bonded chromium oxide wherein the amount of the chromium oxide present in the solid film lubricant ranges from about 10 wt. % to about 60 wt. % and the bonding metal is an alloy containing Cr and at least one of Ni, Co or mixtures thereof, wherein the amount of the bonding metal ranges from about 20 wt. % to about 80 wt. %, the solid film lubricant further containing about 5 wt. % to about 20 wt. % of metal fluoride, wherein the metal fluoride comprises a eutectic mixture of barium and calcium fluorides and, optionally, from about 5 wt. % to about 20 wt. % of one or more low temperature lubricating metals selected from the group consisting of Ag, Au, Pt, Pd, Rh, Cu and mixtures thereof.

9. A method of making a foil bearing, the foil bearing having an inner surface, an inner portion, a graded portion, and an outer portion, the method comprising the steps of:

thermally spraying a first material onto an outer surface of a sacrificial substrate to form the foil bearing inner portion, the first material comprising a solid film lubricant, and the outer surface having a shape that is complementary to the foil bearing inner surface;

forming the graded portion over the inner portion, the graded portion comprising the first material and a metal, the step of forming comprising:

thermally spraying the first material and the metal onto the inner portion at a first ratio to form a first portion of the graded portion;

adjusting the first ratio to a second ratio; and thermally spraying the first material and metal over the first portion at the second ratio to form a second portion of the graded portion;

thermally spraying a second material comprising the metal over the graded portion to form an outer portion;

removing the sacrificial substrate to expose an inner surface of the foil bearing;

cutting a portion of the foil bearing to form a slit therein; and bending the cut portion of the foil bearing outward to form a flange.

10. The method of claim 9, wherein the step of thermally spraying a first material comprises thermally spraying a first material comprising a solid film lubricant including:

chromium oxide; and metal fluoride, wherein the metal fluoride comprises a fluoride of at least one metal selected from the group consisting of a Group IA alkali earth metal, a Group HA alkaline earth metal, rare earth metal, and mixtures thereof; and optionally, one or more low temperature lubricating metals selected from the group consisting of Ag, Au, Pt, Pd, Rh, Cu and mixtures thereof.

11. The method of claim 9, wherein the step of thermally spraying a first material comprises thermally spraying a first material comprising a solid film lubricant including: metal bonded chromium oxide wherein the amount of the chromium oxide present in the material ranges from about 10 wt. % to about 60 wt. %, and the bonding metal is an alloy containing Cr and at least one of Ni, Co or mixtures thereof, wherein the amount of the bonding metal present ranges from about 20 wt. % to about 80 wt. %; about 5 wt. % to about 20 wt. % of a metal fluoride, wherein the metal fluoride comprises a fluoride of at least one metal selected from the group consisting of a Group IA alkali earth metal, a Group HA alkaline earth metal, rare earth metal, and mixtures thereof.

12. The method of claim 9, wherein the step of thermally spraying a first material comprises thermally spraying a first material comprising a solid film lubricant consisting of from about (I) 60 wt. % to about 80% of metal bonded, particulate $Cr_2O_3$, wherein the bonding metal is an alloy containing Cr and at least one of Ni, Co or mixtures thereof (ii) about 5 wt. % to about 20 wt. % of a fluoride of at least one metal selected from the group consisting of a metal of Group IA, Group IIA, rare earth metal and mixtures thereof, and optionally, (iii) about 5 wt. % to about 20 wt. % of a low temperature metal lubricant selected from the group consisting of Ag, Au, Pt, Pd, Rh, Cu and mixtures thereof.

13. The method of claim 9, wherein the step of thermally spraying a first material comprises thermally spraying a first material comprising a solid film lubricant including metal bonded chromium oxide wherein the amount of the chromium oxide present in the solid film lubricant ranges from about 10 wt. % to about 60 wt. % and the bonding metal is an alloy containing Cr and at least one of Ni, Co or mixtures thereof, wherein the amount of the bonding metal ranges from about 20 wt. % to about 80 wt. %, the solid film lubricant further containing about 5 wt. % to about 20 wt. % of metal fluoride, wherein the metal fluoride comprises a eutectic mixture of barium and calcium fluorides and, optionally, from about 5 wt. % to about 20 wt. % of one or more low temperature lubricating metals selected from the group consisting of Ag, Au, Pt, Pd, Rh, Cu and mixtures thereof.

14. The method of claim 9, wherein the step of thermally spraying a first material comprises:

thermally spraying the first material onto an outer surface of a cylindrically shaped sacrificial substrate.

15. The method of claim 9, wherein:

the step of thermally spraying a first material comprises thermally spraying the first material onto an outer surface of a rectangular shaped sacrificial substrate; and the step of removing the sacrificial substrate comprises removing the sacrificial substrate to form a foil sheet.

\* \* \* \* \*